United States Patent
Chen et al.

(10) Patent No.: US 10,379,875 B2
(45) Date of Patent: Aug. 13, 2019

(54) SOLID STATE STORAGE DEVICE AND PROGRAM LOADING METHOD THEREOF

(71) Applicants: Lite-On Electronics (Guangzhou) Limited, Guangzhou (CN); LITE-ON TECHNOLOGY CORPORATION, Taipei (TW)

(72) Inventors: Ping-Jie Chen, Taipei (TW); Sheng-Yu Chang, Taipei (TW); Chien-Chih Weng, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 38 days.

(21) Appl. No.: 15/872,004

(22) Filed: Jan. 16, 2018

(65) Prior Publication Data
US 2019/0155612 A1 May 23, 2019

(30) Foreign Application Priority Data
Nov. 23, 2017 (CN) .......................... 2017 1 1181808

(51) Int. Cl.
*G06F 9/445* (2018.01)
*G06F 3/06* (2006.01)

(52) U.S. Cl.
CPC .............. *G06F 9/445* (2013.01); *G06F 3/065* (2013.01); *G06F 3/0625* (2013.01);
(Continued)

(58) Field of Classification Search
CPC .. G06F 2212/452; G06F 3/061; G06F 3/0683; G06F 15/7892; G06F 21/572; G06F 21/575; G06F 3/0629; G06F 3/0625; G06F 3/0632; G06F 3/0634; G06F 3/065; G06F 3/0679; G06F 9/445
(Continued)

(56) References Cited

U.S. PATENT DOCUMENTS

| | | | | |
|---|---|---|---|---|
| 5,497,475 A | * | 3/1996 | Alapat | ................ G11C 16/0441 326/38 |
| 2012/0151123 A1 | * | 6/2012 | Toda | .................... G06F 11/1072 711/103 |

(Continued)

FOREIGN PATENT DOCUMENTS

WO    WO2015154541 A1    10/2015

*Primary Examiner* — Hashem Farrokh
(74) *Attorney, Agent, or Firm* — WPAT, PC (57) ABSTRACT

A solid state storage device includes a control circuit and a non-volatile memory. The control circuit includes a first storage zone and a second storage zone. A boot code loader is stored in the first storage zone. The non-volatile memory includes a memory cell array. The memory cell array includes a third storage zone and a fourth storage zone. A specified program is stored in the third storage zone. The third storage zone contains a first block. A first page of the first block is divided into a first portion and a second portion. A first binary code of the specified program is repeatedly stored in plural bytes of the first portion of the first page. The one's complement of the first binary code is repeatedly stored in plural bytes of the second portion of the first page.

8 Claims, 5 Drawing Sheets

(52) U.S. Cl.
CPC .......... *G06F 3/0632* (2013.01); *G06F 3/0634* (2013.01); *G06F 3/0679* (2013.01)

(58) Field of Classification Search
USPC ........................................................ 711/103
See application file for complete search history.

(56) References Cited

U.S. PATENT DOCUMENTS

| | | | |
|---|---|---|---|
| 2014/0244912 A1* | 8/2014 | Birk | .................... G06F 12/0246 711/103 |
| 2016/0188430 A1 | 6/2016 | Nitta | |

* cited by examiner

| | Byte[0] | Byte[1] | ... | Byte[8191] | Byte[8192] | Byte[8193] | ... | Byte[16383] |
|---|---|---|---|---|---|---|---|---|
| Page 0 | FW b0 | FW b0 | ... | FW b0 | FW b0 | FW b0 | ... | FW b0 |
| Page 1 | FW b1 | FW b1 | ... | FW b1 | FW b1 | FW b1 | ... | FW b1 |
| Page 2 | FW b2 | FW b2 | ... | FW b2 | FW b2 | FW b2 | ... | FW b2 |
| ... | ... | ... | ... | ... | ... | ... | ... | ... |
| Page n | FW bn | FW bn | ... | FW bn | FW bn | FW bn | ... | FW bn |
| ... | ... | ... | ... | ... | ... | ... | ... | ... |

| Byte [0] | Byte [1] | ... | Byte [8191] | Byte [8192] | Byte [8193] | ... | Byte [16383] | |
|---|---|---|---|---|---|---|---|---|
| purpose b0 | purpose b0 | ... | purpose b0 | purpose b0 | purpose b0 | ... | purpose b0 | Page 0 |
| payload b1 | payload b1 | ... | payload b1 | payload b1 | payload b1 | ... | payload b1 | Page 1 |
| purpose b2 | purpose b2 | ... | purpose b2 | purpose b2 | purpose b2 | ... | purpose b2 | Page 2 |
| ... | ... | ... | ... | ... | ... | ... | ... | ... |
| purpose bm-1 | purpose bm-1 | ... | purpose bm-1 | purpose bm-1 | purpose bm-1 | ... | purpose bm-1 | Page m-1 |
| payload bm | payload bm | ... | payload bm | payload bm | payload bm | ... | payload bm | Page m |
| ... | ... | ... | ... | ... | ... | ... | ... | ... |

FIG. 5A

| Action | binary code (Hex) | 1's of binary code (Hex) |
|---|---|---|
| command | 0x43 | 0xBC |
| address | 0x41 | 0xBE |
| offset | 0x4F | 0xB0 |
| Sleep in (ms) | 0x57 | 0xAB |
| compare | 0x70 | 0x8F |

FIG. 5B

SOLID STATE STORAGE DEVICE AND PROGRAM LOADING METHOD THEREOF

This application claims the benefit of People's Republic of China Patent Application No. 201711181808.4, filed Nov. 23, 2017, the subject matter of which is incorporated herein by reference.

FIELD OF THE INVENTION

The present invention relates to a solid state storage device and a control method, and more particularly to a solid state storage device and a program loading method.

BACKGROUND OF THE INVENTION

Figure 1:
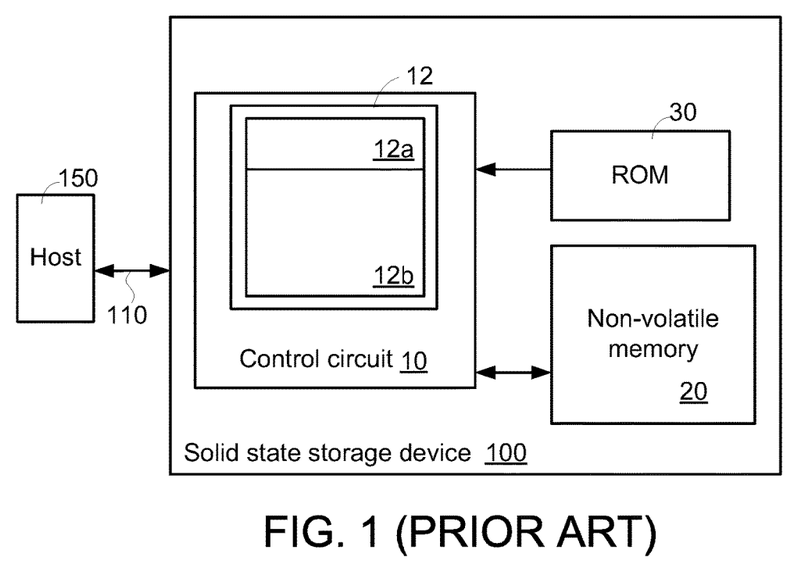
FIG. 1 (prior art) is a schematic functional block diagram illustrating the architecture of a conventional solid state storage device.

As is well known, solid state storage devices such as SD cards or solid state drives (SSD) are widely used in various electronic devices. Generally, a solid state storage device comprises a controlling circuit and a non-volatile memory. FIG. 1 is a schematic functional block diagram illustrating the architecture of a conventional solid state storage device. As shown in FIG. 1, the solid state storage device 100 comprises a control circuit 10, a read only memory (ROM) 30 and a non-volatile memory 20. The non-volatile memory 20 is used for storing write data. A firmware program is stored in the read only memory. When the firmware program is executed, associated operations of the solid state storage device 100 are performed.

The solid state storage device 100 is connected with a host 150 through an external bus 110. For example, the external bus 110 is a USB bus, an SATA bus, a PCIe bus, an M.2 bus, a U.2 bus, or the like.

As shown in FIG. 1, the control circuit 10 comprises a storage unit 12. The storage unit 12 comprises a first storage zone 12a and a second storage zone 12b. After the control circuit 10 is produced, a boot code loader has been stored in the first storage zone 12a in order to enable the solid state storage device 100. Generally, the first storage zone 12a is set as a read-only storage zone. Consequently, the boot code loader cannot be modified. Moreover, the boot code loader is still stored in the first storage zone 12a when the supplied electric power is interrupted.

After the solid state storage device 100 receives the electric power, a start-up procedure is performed. During the start-up procedure, the boot code loader in the first storage zone 12a is executed by the control circuit 10. Consequently, the firmware program in the read only memory 30 is loaded into the second storage zone 12b of the storage unit 12.

After the firmware program in the read only memory 30 is loaded into the second storage zone 12b of the storage unit 12, the start-up procedure is completed. Then, the firmware program in the second storage zone 12b is executed by the control circuit 10. Consequently, the solid state storage device 100 is in a normal working state.

When the solid state storage device 100 is in the normal working state, the control circuit 10 performs the associated operation according to the command from the host 150. For example, according to a write command, a write data from the host 150 is stored into the non-volatile memory 20. Alternatively, according to a read command, a read data is read from the non-volatile memory 20 and transmitted to the host 150 under control of the control circuit 110.

When the electric power supplied to the solid state storage device 100 is interrupted, the firmware program in the second storage zone 12b of the storage unit 12 is lost. After the solid state storage device 10 receives the electric power again and the start-up procedure is performed, the boot code loader in the first storage zone 12a is executed by the control circuit 10. Consequently, the firmware program in the read only memory 30 is loaded into the second storage zone 12b of the storage unit 12 again.

For example, the read only memory 30 of the solid state storage device 100 is a one-time programmable read only memory (OTPROM) or an electrically-erasable programmable read only memory (EEPROM) that has a small memory capacity.

In the conventional solid state storage device 100, the read only memory 30 is used for storing the firmware program only. Moreover, the use of the read only memory 30 increases the cost of the solid state storage device 100.

SUMMARY OF THE INVENTION

An object of the present invention provides a solid state storage device and a program loading method. The solid state storage device is not equipped with a read only memory. A specified program is stored in the non-volatile memory. The binary code of the specified program is stored in the non-volatile memory in a specified storing manner. Consequently, the solid state storage device is cost-effective. Moreover, the specified program can be successfully loaded into the control circuit, and the solid state storage device can be normally operated.

An embodiment of the present invention provides a solid state storage device. The solid state storage device includes a control circuit and a non-volatile memory. The control circuit includes a storage unit. The storage unit includes a first storage zone and a second storage zone. A boot code loader is stored in the first storage zone. The non-volatile memory is connected with the control circuit, and includes a memory cell array. The memory cell array includes a third storage zone and a fourth storage zone. A specified program is stored in the third storage zone. The control circuit controls an operation of the non-volatile memory according to the specified program. The third storage zone contains a first block. The first block contains plural pages. A first page of the first block is divided into a first portion and a second portion. A first binary code of the specified program is repeatedly stored in plural bytes of the first portion of the first page. The one's complement of the first binary code is repeatedly stored in plural bytes of the second portion of the first page.

Another embodiment of the present invention provides a program loading method for a solid state storage device. The program loading method includes the following steps. In the step (a), a data of the first page of the first block in the third storage zone is read. In a step (b), a specified byte is selected from the first portion of the first page, a corresponding byte is obtained from the second portion of the first page, and the sum of a content of the specified byte and a content of the corresponding byte is calculated. In a step (c), if the sum is "11111111", the content of the specified byte is used as the first binary code and the first binary code is stored into the second storage zone.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 2:
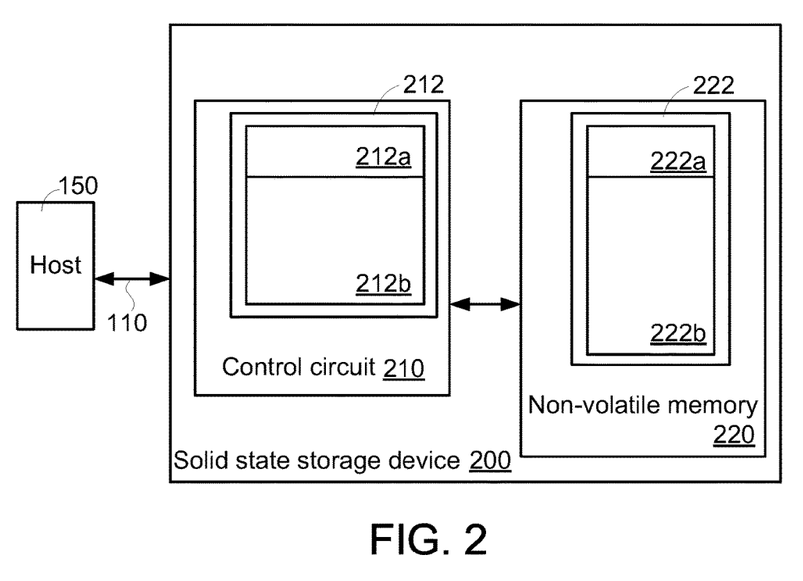
FIG. 2 is a schematic functional block diagram illustrating the architecture of a solid state storage device according to a first embodiment of the present invention.

FIG. 2 is a schematic functional block diagram illustrating the architecture of a solid state storage device according to a first embodiment of the present invention. As shown in FIG. 2, the solid state storage device 200 comprises a control circuit 210 and a non-volatile memory 220. The non-volatile memory 220 is connected with the control circuit 210. Moreover, the non-volatile memory 220 further comprises a memory cell array 222.

The solid state storage device 200 is connected with a host 150 through an external bus 110. For example, the external bus 110 is a USB bus, an SATA bus, a PCIe bus, an M.2 bus, a U.2 bus, or the like.

The control circuit 210 comprises a storage unit 212. The storage unit 212 comprises a first storage zone 212a and a second storage zone 212b. After the control circuit 210 is produced, a boot code loader has been stored in the first storage zone 212a in order to enable the solid state storage device 200. Generally, the first storage zone 212a is set as a read-only storage zone. Consequently, the boot code loader cannot be modified. Moreover, the boot code loader is still stored in the first storage zone 212a when the supplied electric power is interrupted.

The memory cell array 222 of the non-volatile memory 220 contains plural blocks. In addition, each block contains plural pages. For example, the memory cell array 222 contains 1024 blocks, and each block contains 256 pages. Each page is typically 16 k bytes in size.

In this embodiment, the memory cell array 222 is divided into a third storage zone 222a and a fourth storage zone 222b. The third storage zone 222a is used for storing a firmware program. The fourth storage zone 222b is used for storing the write data from the host 15. For example, 16 blocks of the memory cell array 222 are used as the third storage zone 222a for storing the firmware program, and the other 1008 blocks are used as the fourth storage zone 222b for storing the write data from the host 15. When the firmware program is executed, associated operations of the solid state storage device 200 are performed.

After the solid state storage device 200 receives the electric power, a start-up procedure is performed. During the start-up procedure, the boot code loader in the first storage zone 212a of the storage unit 212 is executed by the control circuit 210. Moreover, the firmware program in the third storage zone 222a of the memory cell array 222 is loaded into the second storage zone 212b of the storage unit 212 according to the boot code loader.

After the firmware program in the third storage zone 222a of the memory cell array 222 is loaded into the second storage zone 212b of the storage unit 212, the start-up procedure is completed. Then, the firmware program in the second storage zone 212b is executed by the control circuit 210. Consequently, the solid state storage device 200 is in a normal working state.

When the solid state storage device 200 is in the normal working state, the control circuit 210 performs the associated operation according to the command from the host 150. For example, according to a write command, a write data from the host 150 is stored into the fourth storage zone 222b of the memory cell array 222. Alternatively, according to a read command, a read data is read from the fourth storage zone 222b of the memory cell array 222 and transmitted to the host 150 under control of the control circuit 210.

When the electric power supplied to the solid state storage device 200 is interrupted, the firmware program in the second storage zone 212b of the storage unit 212 is lost. After the solid state storage device 200 receives the electric power again and the start-up procedure is performed, the boot code loader in the first storage zone 212a is executed by the control circuit 210. Consequently, the firmware program in the third storage zone 222a of the memory cell array 222 is loaded into the second storage zone 212b of the storage unit 212 according to the boot code loader again.

In this embodiment, the firmware program for performing associated operations of the solid state storage device 200 is stored in the non-volatile memory 220 rather than the read only memory. Consequently, the solid state storage device 200 of the present invention is more cost-effective. However, as the time period of using the non-volatile memory 220 increases, the quality of the memory cell array 222 of the non-volatile memory 220 is gradually deteriorated or even the firmware program is suffered from a data collapse problem. In case that the data collapse problem occurs, the firmware program cannot be correctly read and thus the solid state storage device 200 cannot be normally operated. In accordance with the present invention, the firmware program is repeatedly stored in the non-volatile memory 220. That is, the binary codes of the firmware program are repeatedly stored in the memory cell array 222 of the non-volatile memory 220. In case that a part of the binary code of the firmware program in the third storage zone 222a has the data collapse problem, the control circuit 210 still can successfully read the firmware program according to the contents of the third storage zone 222a and loads the firmware program into the second storage zone 212b.

Figure 3A:
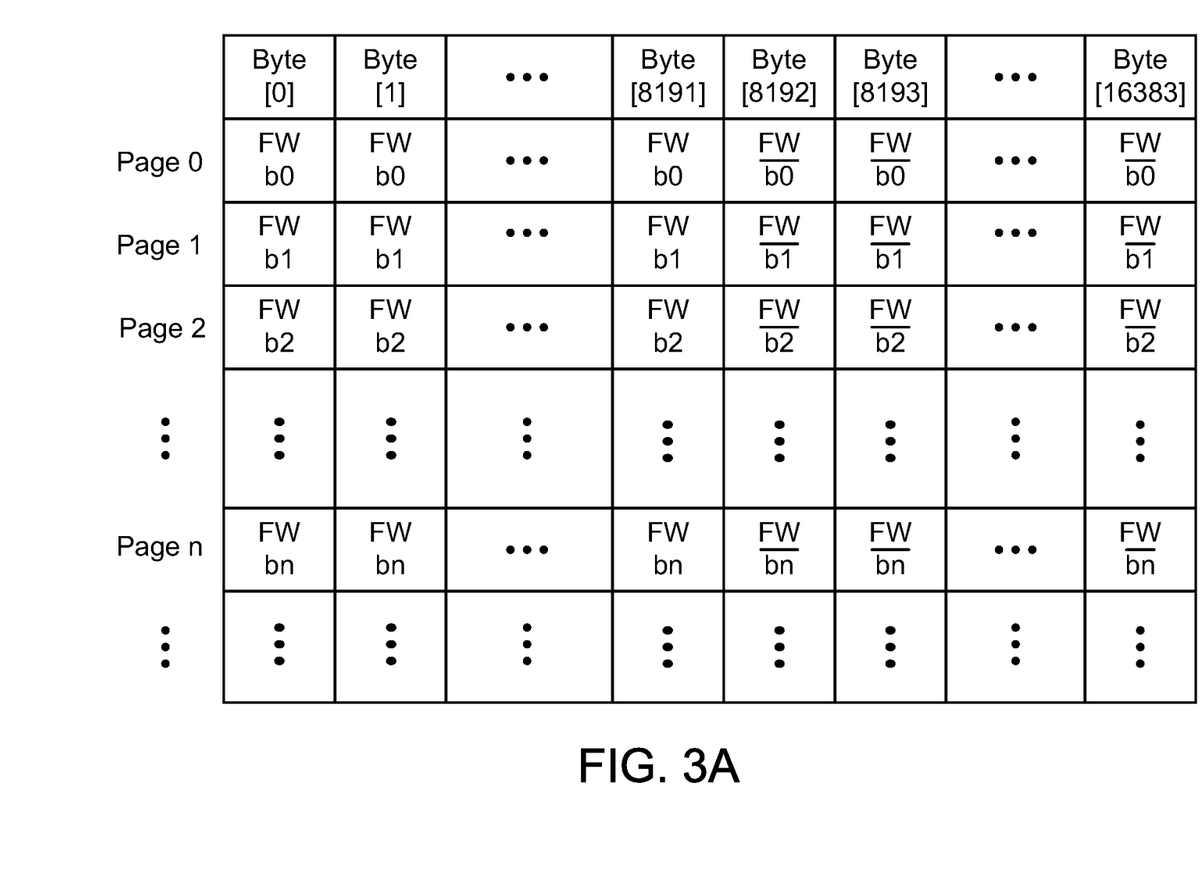
FIG. 3A schematically illustrates the data structure of the firmware program stored in the third storage zone of the memory cell array of the solid state storage device according to the first embodiment of the present invention.

FIG. 3A schematically illustrates the data structure of the firmware program stored in the third storage zone of the memory cell array of the solid state storage device according to the first embodiment of the present invention. The memory cell array 222 contains 1024 blocks, and each block contains 256 pages. Each page is typically 16 k bytes in size.

In an embodiment, one-byte binary code of the firmware program is repeatedly stored in the one-page space of the third storage zone 222a. That is, one-page space of the third storage zone 222a stores one-byte binary code of the firmware program. For example, the size of the firmware program is 4 k bytes. That is, the firmware program is composed of 4 k binary codes. Consequently, the third storage zone 222a needs 4 k pages of space to store the firmware program. The capacity of the third storage zone 222a is 64 Mbytes (i.e., 4 k×16 kbytes=64 Mbytes). That is, the firmware program with a size of 4 k bytes is stored in the 64-Mbyte third storage zone 222a.

For assuring the data accuracy in the third storage zone 222a, one-page space of the third storage zone 222a for storing one-byte binary code of the firmware program is divided into a first portion and a second portion. A binary code of the firmware program is repeatedly stored in plural bytes of the first portion of the corresponding page. The one's complement of the binary code is repeatedly stored in plural bytes of the second portion of the corresponding page. The plural bytes of the first portion correspond to the plural bytes of the second portion, respectively.

Please refer to FIG. 3A again. Each page is divided into two portions. The first portion of each page contains 8192 bytes, i.e., Byte [0]~Byte [8191]. The second portion of each page contains 8192 bytes, i.e., Byte [8192]~Byte [16383].

The zero-th page (Page 0) stores the zero-th binary code information of the firmware program. The zero-th binary code FW b0 of the firmware program is repeatedly stored in the 8192 bytes of the first portion of the zero-th page. The one's complement of the zero-th binary code, i.e., FW $\overline{b0}$ is repeatedly stored in the 8192 bytes of the second portion of the zero-th page. For example, if the binary code is "11001010", and the one's complement of the binary code is "00110101".

The first page (Page 1) stores the first binary code information of the firmware program. The first binary code FW b1 of the firmware program is repeatedly stored in the 8192 bytes of the first portion of the first page. The one's complement of the first binary code, i.e., FW $\overline{b1}$ is repeatedly stored in the 8192 bytes of the second portion of the first page.

Similarly, the n-th page (Page n) stores the n-th binary code information of the firmware program. The n-th binary code FW bn of the firmware program is repeatedly stored in the 8192 bytes of the first portion of the n-th page. The one's complement of the n-th binary code, i.e., FW $\overline{bn}$ is repeatedly stored in the 8192 bytes of the second portion of the n-th page. The rest may be deduced by analogy.

In other words, the capacity of 4 k pages (Page 0~Page 4095) is used to store the 4 k binary codes of the firmware program.

Figure 3B:
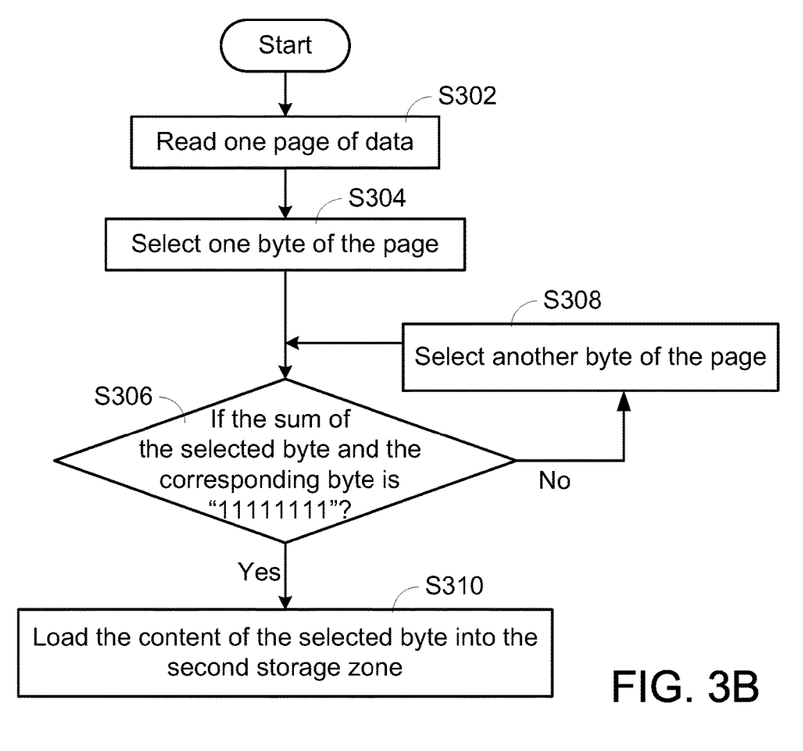
FIG. 3B is a flowchart illustrating a program loading method according to an embodiment of the present invention.

FIG. 3B is a flowchart illustrating a program loading method according to an embodiment of the present invention. The program loading method is implemented by a boot code loader. When the control circuit 210 executes the boot code loader to perform the start-up procedure, the firmware program in the third storage zone 222a of the memory cell array 222 is loaded into the second storage zone 212b of the storage unit 212.

As mentioned above, each page of the third storage zone 222a stores one binary code information of the firmware program. Consequently, after the control circuit 210 reads one page of data, the control circuit 210 generates a binary code of the firmware program according to the binary code information and loads the binary code into the second storage zone 212b.

Please refer to FIG. 3B. Firstly, one page of data is read (Step S302). That is, the control circuit 210 reads one page of data from the third storage zone 222a.

Then, one byte of the page is selected (Step S304). In the step S304, the control circuit 210 selects one byte from the plural bytes of the first portion and obtains the corresponding one byte from the plural bytes of the second portion. Then, a step S306 is performed to judge whether the sum of the selected byte and the corresponding byte is "11111111".

Take the data structure of FIG. 3A for example. The first portion of each page contains 8192 bytes, i.e., Byte [0]~Byte [8191]. The second portion of each page contains 8192 bytes, i.e., Byte [8192]~Byte [16383]. The first byte Byte [0] of the first portion corresponds to the first byte Byte [8192] of the second portion. The first byte Byte [1] of the first portion corresponds to the first byte Byte [8193] of the second portion. The rest may be deduced by analogy. For example, in case that the control circuit 210 selects the first byte Byte [0] of the first portion in the step S304, the corresponding first byte Byte [8192] of the second portion is obtained. Then, the step S306 is performed to judge whether the sum of the selected byte Byte [0] and the corresponding byte Byte [8192] is "11111111".

Please refer to FIG. 3B again. If the sum is "11111111", it means that the content of the selected byte matches the binary code of the firmware program. Then, the content of the selected byte is loaded into the second storage zone 212b (Step S310).

Whereas, if the sum is not "11111111", it means that the content of the selected byte is erroneous and fails to match the binary code of the firmware program. Then, another byte of the page is selected (Step S308) and the step S306 is repeatedly done.

For example, after the control circuit 210 reads the data of the zero-th page, the control circuit 210 selects the zero-th byte Byte [0] of the first portion. If the obtained content of the zero-th byte (i.e., Byte [0]) is "11001010" and the obtained content of its corresponding 8192-th byte (i.e., Byte [8192]) of the second portion is "00110101", the sum of the zero-th byte and the 8192-th byte is "11111111". Meanwhile, the content of the selected byte matches the binary code of the firmware program. Then, the content of the zero-th byte Byte [0] is used as the zero-th binary code of the firmware program and loaded into the second storage zone 212b.

Whereas, if any bit of the zero-th byte (i.e., Byte [0]) and its corresponding 8192-th byte (i.e., Byte [8192]) is erroneous, the sum of the zero-th byte and the 8192-th byte is not "11111111". Then, the control circuit 210 selects another byte of the first portion, for example the first byte (Byte [1]). Then, the control circuit 210 judges whether the sum of the first byte (Byte [1]) and its corresponding 8193-th byte (Byte [8193]) is "11111111".

It is noted that the way of dividing each page into the first portion and the second portion is not restricted. For example, in another embodiment, the first portion and the second portion of each page are classified according to the odd/even order of the bytes. For example, the first portion of each page contains the zero-th byte (Byte [0]), the second byte (Byte [2]), the fourth byte (Byte [4]), . . . , and so on. In addition, one binary code of the firmware program is repeatedly stored in all bytes of the first portion of the corresponding page. On the other hand, the second portion of each page contains the first byte (Byte [1]), the third byte (Byte [3]), the fifth byte (Byte [5]), . . . , and so on. In addition, the one's complement of the binary code is repeatedly stored in all bytes of the second portion of the corresponding page. The zero-th byte (Byte [0]) corresponds to the first byte (Byte [1]). The second byte (Byte [2]) corresponds to the third byte (Byte [3]). The rest may be deduced by analogy.

As mentioned above, the degradation of the memory cell array 222 may result in a data collapse problem of the stored firmware program. For solving the data collapse problem, one-page space is used to repeatedly store a binary code of the firmware program and the one's complement of the binary code. After the control circuit 210 reads a page of data, the control circuit 210 judges whether the sum of the selected byte and the corresponding byte is "11111111". If the sum is "11111111", it means that the data is accurate. The binary code of the firmware program is repeatedly stored in the first portion, and the one's complement of the binary code is repeatedly stored in the second portion. If the sum of any selected byte of the first portion and the corresponding byte of the second portion is "11111111", one-byte binary code of the firmware program is confirmed. Consequently, the program loading method of the present invention can solve the drawbacks of the conventional technology. Even if the degradation of the memory cell array 222 occurs, the control circuit 210 can still load the binary code of the firmware program into the second storage zone 212b.

In the example of FIG. 3B, one-byte binary code of the firmware program is obtained according to the binary code information of one page and then loaded into the second storage zone 212b. In case that the size of the firmware program is and the firmware program contains 4 k binary codes, each of the 4 k pages (i.e., Page 0~Page 4095) has to undergo the flowchart of FIG. 3B once. Consequently, the 4 k binary codes of the firmware program are obtained and loaded into the second storage zone 212b.

In the above embodiment, the program loading method is employed to load the firmware program. In some other embodiments, the program loading method is employed to load any other appropriate program or data from the non-volatile memory to the storage unit of the control circuit. In the following embodiment, the program is a configuration program.

With increasing development of the semiconductor manufacturing process, the non-volatile memories with new specifications are continuously introduced into the market. Before the non-volatile memory with the new specifications is in the normal working state, the non-volatile memory has to receive a configuration action from the control circuit. If the configuration action is not received, the non-volatile memory may generate many errors.

For allowing the control circuit to issue the configuration action to the new non-volatile memory and allowing the new non-volatile memory to be normally operated, the present invention further provides a configuration program. The configuration program is stored in the new non-volatile memory. When the start-up procedure of the solid state storage device is performed, the control circuit loads the configuration program and the firmware program into the control circuit. Then, the control circuit issues the configuration action to the new non-volatile memory according to the configuration program. Then, the control circuit executes the firmware program, and the solid state storage device enters the normal working state.

Figure 4:
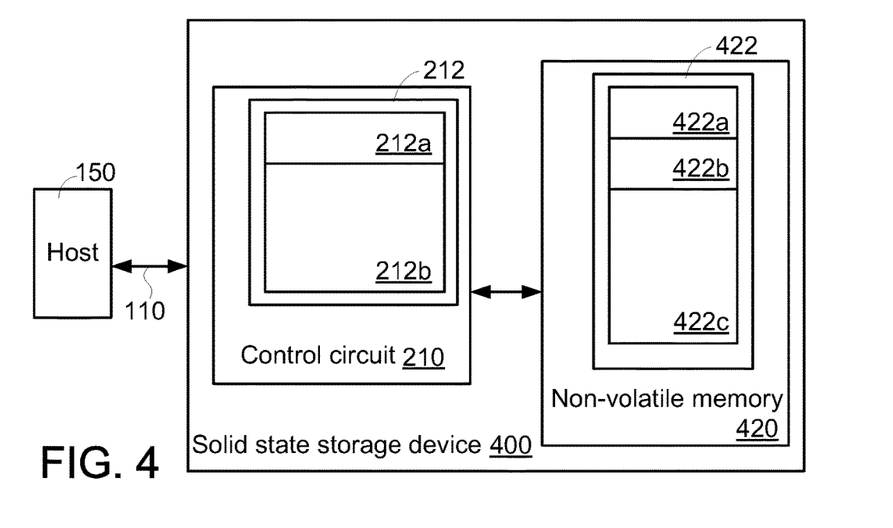
FIG. 4 is a schematic functional block diagram illustrating the architecture of a solid state storage device according to a second embodiment of the present invention.

FIG. 4 is a schematic functional block diagram illustrating the architecture of a solid state storage device according to a second embodiment of the present invention. As shown in FIG. 4, the solid state storage device 400 comprises a control circuit 210 and a non-volatile memory 420. The non-volatile memory 420 is connected with the control circuit 210. Moreover, the non-volatile memory 420 further comprises a memory cell array 422. The structure of the control circuit 210 is similar to that of the first embodiment, and is not redundantly described herein.

In this embodiment, the memory cell array 422 is divided into a third storage zone 422a, a fourth storage zone 422b and a fifth storage zone 422c. The third storage zone 422a is used for storing a configuration program. The fourth storage zone 422b is used for storing a firmware program. The fifth storage zone 422c is used for storing the write data from the host 15. For example, 1 block of the memory cell array 422 is used as the third storage zone 422a, 16 blocks of the memory cell array 422 are used as the fourth storage zone 422b, and the other 1007 blocks are used as the fifth storage zone 422c.

After the solid state storage device 400 receives the electric power, a start-up procedure is performed. During the start-up procedure, the boot code loader in the first storage zone 212a of the storage unit 212 is executed by the control circuit 210. Moreover, according to the boot code loader, the configuration program in the third storage zone 422a of the memory cell array 422 and the firmware program in the fourth storage zone 422b of the memory cell array 422 are loaded into the second storage zone 212b of the storage unit 212.

After the configuration program in the third storage zone 422a and the firmware program in the fourth storage zone 422b are loaded into the second storage zone 212b of the storage unit 212, the start-up procedure is completed. Then, the configuration program in the second storage zone 212b is executed by the control circuit 210. Consequently, the control circuit issues the configuration action to the non-volatile memory 420. Then, the firmware program in the second storage zone 212b is executed by the control circuit 210. Consequently, the solid state storage device 400 is in a normal working state.

When the solid state storage device 400 is in the normal working state, the control circuit 210 performs the associated operation according to the command from the host 150. For example, according to a write command, a write data from the host 150 is stored into the fifth storage zone 422c of the memory cell array 422. Alternatively, according to a read command, a read data is read from the fifth storage zone 422c of the memory cell array 422 and transmitted to the host 150 under control of the control circuit 210.

When the electric power supplied to the solid state storage device 400 is interrupted, the configuration program and the firmware program in the second storage zone 212b of the storage unit 212 are lost. After the solid state storage device 400 receives the electric power again and the start-up procedure is performed, the boot code loader in the first storage zone 212a is executed by the control circuit 210. According to the boot code loader, the configuration program in the third storage zone 422a and the firmware program in the fourth storage zone 422b are loaded into the second storage zone 212b of the storage unit 212 again.

Figure 5A:
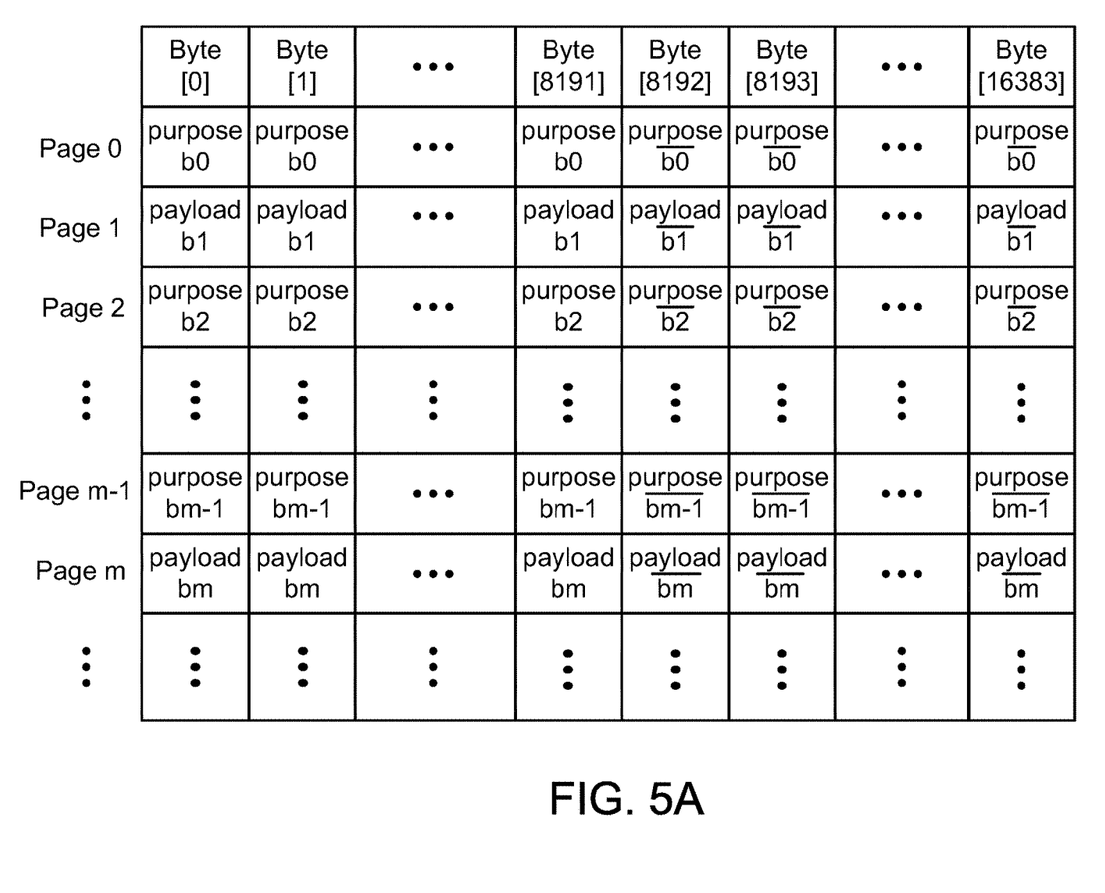
FIG. 5A schematically illustrates the data structure of the configuration program stored in the third storage zone of the memory cell array of the solid state storage device according to the second embodiment of the present invention.

FIG. 5A schematically illustrates the data structure of the configuration program stored in the third storage zone of the memory cell array of the solid state storage device according to the second embodiment of the present invention. The memory cell array 422 contains 1024 blocks, and each block contains 256 pages. Each page is typically 16 k bytes in size.

In an embodiment, one-byte binary code of the configuration program is repeatedly stored in the one-page space of the third storage zone 422a. That is, one-page space of the third storage zone 422a stores one-byte binary code of the configuration program. For example, the size of the configuration program is 265 bytes. That is, the configuration program is composed of 265 binary codes. Consequently, the third storage zone 4222a needs 256 pages of space to store the configuration program. The capacity of the third storage zone 422a is 4 Mbytes (i.e., 256×16 kbyte=4

Mbytes). That is, the configuration program with a size of 256 bytes is stored in the 4-Mbyte third storage zone 422a.

For assuring the data accuracy in the third storage zone 422a, one-page space of the third storage zone 422a for storing one-byte binary code of the configuration program is divided into a first portion and a second portion. A binary code of the configuration program is repeatedly stored in plural bytes of the first portion of the corresponding page. The one's complement of the binary code is repeatedly stored in plural bytes of the second portion of the corresponding page. The plural bytes of the first portion correspond to the plural bytes of the second portion, respectively.

Please refer to FIG. 5A again. Each page is divided into two portions. The first portion of each page contains 8192 bytes, i.e., Byte [0]~Byte [8191]. The second portion of each page contains 8192 bytes, i.e., Byte [8192]-Byte [16383].

The zero-th page (Page 0) stores the zero-th binary code information of the configuration program. The zero-th binary code of the configuration program (e.g., purpose b0) is repeatedly stored in the 8192 bytes of the first portion of the zero-th page. The one's complement of the zero-th binary code (e.g., purpose $\overline{b0}$) is repeatedly stored in the 8192 bytes of the second portion of the zero-th page.

The first page (Page 1) stores the first binary code information of the configuration program. The first binary code of the configuration program (e.g., payload b1) is repeatedly stored in the 8192 bytes of the first portion of the first page. The one's complement of the first binary code (e.g., payload $\overline{b1}$) is repeatedly stored in the 8192 bytes of the second portion of the first page.

Similarly, the (m−1)-th page (Page m−1) stores the (m−1)-th binary code information of the configuration program. The (m−1)-th binary code of the configuration program (e.g., purpose bm−1) is repeatedly stored in the 8192 bytes of the first portion of the (m−1)-th page. The one's complement of the (m−1)-th binary code (e.g., purpose $\overline{m-1}$) is repeatedly stored in the 8192 bytes of the second portion of the (m−1)-th page.

Similarly, the (m)-th page (Page m) stores the (m)-th binary code information of the configuration program. The (m)-th binary code of the configuration program (e.g., payload bm) is repeatedly stored in the 8192 bytes of the first portion of the (m)-th page. The one's complement of the (m)-th binary code (e.g., payload $\overline{bm}$) is repeatedly stored in the 8192 bytes of the second portion of the (m)-th page.

In this embodiment, the fields of the configuration program contain a purpose field and a payload field. In other words, the control circuit 210 issues the configuration action to the non-volatile memory 420 according to the binary codes of the purpose field and the payload field.

Figure 5B:
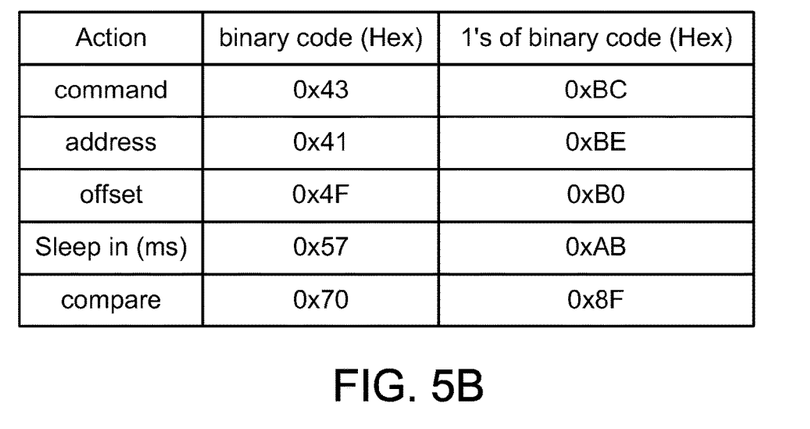
FIG. 5B schematically illustrates the contents of the binary code and the one's complement of the binary code in the purpose field of the configuration program.

FIG. 5B schematically illustrates the contents of the binary code and the one's complement of the binary code in the purpose field of the configuration program.

In case that the binary code in the purpose field is 0x43 (i.e., "01000011"), the configuration action from the control circuit 210 indicates the action of issuing a command. In case that the binary code in the purpose field is 0x41 (i.e., "01000001"), the configuration action from the control circuit 210 indicates the action of issuing an address. In case that the binary code in the purpose field is 0x4F (i.e., "01001111"), the configuration action from the control circuit 210 indicates the offset of the address. In case that the binary code in the purpose field is 0x57 (i.e., "01010111"), the configuration action from the control circuit 210 indicates the action of instructing the non-volatile memory to sleep for a time period (ms). In case that the binary code in the purpose field is 0x70 (i.e., "01110000"), the configuration action from the control circuit 210 indicates the comparing action.

For example, if the purpose field is "01000011" and the payload field is "11000101" when the control circuit 210 executes the configuration program, the configuration action from the control circuit 210 indicates the action of issuing the command "11000101" to the non-volatile memory 420. Similarly, if the purpose field is "01011111" and the payload field is "00001111" when the control circuit 210 executes the configuration program, the configuration action from the control circuit 210 indicates the action of instructing the non-volatile memory 420 to sleep for a time period "00001111" (ms).

Similarly, by the program loading method of FIG. 3B, the configuration program of FIG. 5A can be loaded into the second storage zone 212b of the control circuit 210.

Firstly, the control circuit 210 reads the data of the zero-th page (Page 0) from the third storage zone 422a. That is, the control circuit 210 reads one page of data from the third storage zone 422a.

Then, one byte of the page is selected. In particular, the control circuit 210 selects one byte from the plural bytes of the first portion and obtains the corresponding byte from the second portion. Then, the control circuit 210 judge whether the sum of the selected byte and the corresponding byte is "11111111".

If the sum is "11111111", it means that the content of the selected byte matches the binary code of the configuration program. Then, the content of the selected byte is loaded into the second storage zone 212b.

Whereas, if the sum is not "11111111", it means that the content of the selected byte is erroneous and fails to match the binary code of the configuration program. Then, another byte of the page is selected and the above steps are repeatedly done.

As mentioned above, the degradation of the memory cell array 422 may result in a data collapse problem of the stored configuration program. For solving the data collapse problem, one-page space is used to repeatedly store a binary code of the configuration program and the one's complement of the binary code. After the control circuit 210 reads a page of data, the control circuit 210 judges whether the sum of the selected byte and the corresponding byte is "11111111". If the sum is "11111111", it means that the data is accurate. The binary code of the configuration program is repeatedly stored in the first portion, and the one's complement of the binary code is repeatedly stored in the second portion. If the sum of any selected byte of the first portion and the corresponding byte of the second portion is "11111111", one-byte binary code of the configuration program is confirmed. Consequently, the program loading method of the present invention can solve the drawbacks of the conventional technology. Even if the degradation of the memory cell array 422 occurs, the control circuit 210 can still load the binary code of the configuration program into the second storage zone 212b.

The methods of storing and loading the configuration program of this embodiment are similar to those of the first embodiment, and are not redundantly described herein.

From the above descriptions, the preset invention provides a solid state storage device and a program loading method. The degradation of the memory cell array may result in a data collapse problem of the configuration program or the firmware program. For solving the data collapse problem, the binary codes of the configuration program or the firmware program are repeatedly stored in the memory cell array. In case that a part of the binary code of the configuration program or the firmware program in the memory cell array has the data collapse problem, the control circuit can successfully read the configuration program or the firmware program according to the contents of the memory cell array and loads the firmware program into the control circuit.

Moreover, one binary code information of the firmware program is stored in one page. The page is divided into a first portion and a second portion. The binary code of the firmware program is stored in the first portion. The one's complement of the binary code is stored in the second portion. It is noted that numerous modifications and alterations may be made while retaining the teachings of the invention.

For example, in another embodiment, a first binary code information and a second binary code information of the firmware program are stored in one page. The page is divided into a first portion, a second portion, a third portion and a fourth portion. The first binary code of the firmware program is stored in the first portion. The one's complement of the first binary code is stored in the second portion. The second binary code of the firmware program is stored in the third portion. The one's complement of the second binary code is stored in the fourth portion. The way of storing the configuration program in the memory cell array is similar to that of storing the firmware program.

In the above embodiment, the binary code of the firmware program is repeatedly stored in the first portion, and the one's complement of the binary code is repeatedly stored in the second portion. If the sum of any selected byte of the first portion and the corresponding byte of the second portion is "11111111", the binary code of the firmware program is confirmed. In another embodiment, the control circuit acquires the sums of plural selected bytes of the first portion and the corresponding bytes of the second portion. If all of the sums are "11111111", the binary code of the firmware program is confirmed.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. A solid state storage device, comprising:
a control circuit comprising a storage unit, wherein the storage unit comprises a first storage zone and a second storage zone, and a boot code loader is stored in the first storage zone; and
a non-volatile memory connected with the control circuit, and comprising a memory cell array, wherein the memory cell array comprises a third storage zone and a fourth storage zone, wherein a specified program is stored in the third storage zone, and the control circuit controls an operation of the non-volatile memory according to the specified program,
wherein the third storage zone contains a first block, the first block contains plural pages, and a first page of the first block is divided into a first portion and a second portion, wherein a first binary code of the specified program is repeatedly stored in plural bytes of the first portion of the first page, and the one's complement of the first binary code is repeatedly stored in plural bytes of the second portion of the first page.

2. The solid state storage device as claimed in claim 1, wherein a second page of the first block in the third storage zone is divided into a first portion and a second portion, wherein a second binary code of the specified program is repeatedly stored in plural bytes of the first portion of the second page, and the one's complement of the second binary code is repeatedly stored in plural bytes of the second portion of the second page.

3. The solid state storage device as claimed in claim 1, wherein when the control circuit executes the boot code loader, the control circuit reads the first page of the first block, acquires the first binary code of the specified program according to a content of the first page and loads the first binary code into the second storage zone of the control circuit.

4. The solid state storage device as claimed in claim 3, wherein the control circuit selects a specified byte from the first portion of the first page and obtains a corresponding byte from the second portion of the first page, wherein if the sum of a content of the specified byte and a content of the corresponding byte is "11111111", the content of the specified byte is used as the first binary code of the specified program and stored into the second storage zone of the control circuit.

5. The solid state storage device as claimed in claim 1, wherein the specified program is a firmware program or a configuration program.

6. The solid state storage device as claimed in claim 1, wherein the memory cell array further comprises a fifth storage zone, the specified program stored in the third storage zone is a firmware program, and a configuration program is stored in the fourth storage zone, wherein the fourth storage zone contains a second block, the second block contains plural pages, and a third page of the second block is divided into a first portion and a second portion, wherein a first binary code of the configuration program is repeatedly stored in plural bytes of the first portion of the third page, and the one's complement of the first binary code of the configuration program is repeatedly stored in plural bytes of the second portion of the third page.

7. A program loading method for a solid state storage device, the program loading method comprising steps of:
(a) reading a data of a first page of a first block in a first storage zone in a non-volatile memory of the solid state storage device, wherein a specified program is stored in the first storage zone, and a control circuit of the solid state storage device controls an operation of the non-volatile memory according to the specified program, wherein a first binary code of the specified program is repeatedly stored in plural bytes of a first portion of the first page, and the one's complement of the first binary code is repeatedly stored in plural bytes of a second portion of the first page;
(b) selecting a specified byte from the first portion of the first page and obtaining a corresponding byte from the second portion of the first page, and calculating the sum of a content of the specified byte and a content of the corresponding byte; and
(c) if the sum is "11111111", confirming that the content of the specified byte is the first binary code and storing the first binary code into tho a second storage zone in a storage unit of the control circuit.

8. The program loading method as claimed in claim 7, further comprising a step (d): if the sum is not "11111111", selecting an another byte from the first portion of the first page and obtaining a corresponding byte from the second portion of the first page, calculating the sum of a content of the another byte and a content of the corresponding byte, and performing the step (c) again.

* * * * *